US012602937B2

(12) United States Patent
 Groves et al.

(10) Patent No.: US 12,602,937 B2
(45) Date of Patent: Apr. 14, 2026

(54) SYSTEMS, METHODS, AND INTERFACES FOR IDENTIFYING COATING SURFACES

(71) Applicant: The Pittsburgh Paints Company, Cranberry Township, PA (US)

(72) Inventors: Francis J. Groves, McMurray, PA (US); Kathleen M. Chrobak, Fombell, PA (US); William R. Wright, Pittsburgh, PA (US)

(73) Assignee: THE PITTSBURGH PAINTS COMPANY, Cranberry Township, PA (US)

( * ) Notice: Subject to any disclaimer, the term of this patent is extended or adjusted under 35 U.S.C. 154(b) by 357 days.

(21) Appl. No.: 18/251,561

(22) PCT Filed: Oct. 12, 2021

(86) PCT No.: PCT/US2021/054580
 § 371 (c)(1),
 (2) Date: May 3, 2023

(87) PCT Pub. No.: WO2022/098477
 PCT Pub. Date: May 12, 2022

(65) Prior Publication Data
 US 2024/0013557 A1     Jan. 11, 2024

Related U.S. Application Data

(60) Provisional application No. 63/110,821, filed on Nov. 6, 2020.

(51) Int. Cl.
 *G06V 10/56* (2022.01)
 *G06T 7/90* (2017.01)
 (Continued)

(52) U.S. Cl.
 CPC ................ *G06V 20/64* (2022.01); *G06T 7/90* (2017.01); *G06T 11/10* (2026.01)

(58) Field of Classification Search
 CPC ........ G06V 20/60; G06V 20/50; G06V 10/56; G06T 7/90; G06T 7/10; G06T 11/001
 (Continued)

(56) References Cited

U.S. PATENT DOCUMENTS

| | | | |
|---|---|---|---|
| 3,653,771 A | 4/1972 | Piringer |
| 5,556,694 A | 9/1996 | Austin |

(Continued)

FOREIGN PATENT DOCUMENTS

| | | |
|---|---|---|
| CN | 205929678 U | 2/2017 |
| CN | 109575874 A | 4/2019 |

(Continued)

OTHER PUBLICATIONS

International Search Report and Written Opinion received for PCT Application Serial No. PCT/US2021/054580 dated Feb. 9, 2022, 10 pages.

(Continued)

*Primary Examiner* — Jamares Q Washington
(74) *Attorney, Agent, or Firm* — Ladas & Parry, LLP

(57) ABSTRACT

A computer system for dynamically parsing a digital image to identify coating surfaces can receive a user-provided input comprising an indication of a particular environment, and a user-provided digital image of an environment. The computer system can also identify, with an image recognition module, one or more objects within the user-provided digital image. Additionally, the computer system can create a modified digital image by parsing the identified objects from the user-provided digital image and identify surfaces within the modified digital image. The computer system can also identify a proposed color for the surfaces within the (Continued)

modified digital image and generate a colorized digital image by integrating the proposed color on at least one surface and integrating the parsed one or more objects in the modified digital image.

14 Claims, 8 Drawing Sheets

(51) Int. Cl.
*G06T 11/10* (2026.01)
*G06V 20/64* (2022.01)

(58) Field of Classification Search
USPC .......................... 382/173, 162, 165, 190, 181
See application file for complete search history.

(56) References Cited

U.S. PATENT DOCUMENTS

| | | | |
|---|---|---|---|
| 5,579,031 A | 11/1996 | Liang | |
| 5,726,800 A | 3/1998 | Ezra et al. | |
| 5,883,708 A | 3/1999 | Jung et al. | |
| 6,252,564 B1 | 6/2001 | Albert et al. | |
| 6,825,829 B1 | 11/2004 | Albert et al. | |
| 9,538,041 B1 | 1/2017 | Chapman | |
| 9,832,868 B1 | 11/2017 | Wright et al. | |
| 2002/0008751 A1 | 1/2002 | Spurgeon et al. | |
| 2002/0012895 A1 | 1/2002 | Lehmann | |
| 2002/0018281 A1 | 2/2002 | Theiste et al. | |
| 2002/0089513 A1 | 7/2002 | Blanchard et al. | |
| 2002/0190975 A1 | 12/2002 | Kerr | |
| 2003/0011560 A1 | 1/2003 | Albert et al. | |
| 2003/0151611 A1 | 8/2003 | Turpin et al. | |
| 2005/0007483 A1 | 1/2005 | Zimmermann et al. | |
| 2005/0099630 A1 | 5/2005 | Reynolds et al. | |
| 2005/0270299 A1 | 12/2005 | Rasmussen et al. | |
| 2005/0280823 A1 | 12/2005 | Lewis et al. | |
| 2006/0152527 A1 | 7/2006 | Minchew et al. | |
| 2007/0146325 A1 | 6/2007 | Poston et al. | |
| 2008/0107856 A1 | 5/2008 | Argoitia et al. | |
| 2009/0201309 A1* | 8/2009 | Demos ...................... G06T 5/90 |
| | | | 345/589 |
| 2010/0310916 A1 | 12/2010 | Coish et al. | |
| 2011/0006110 A1 | 1/2011 | Cleary et al. | |
| 2011/0018895 A1 | 1/2011 | Buzyn et al. | |
| 2011/0018896 A1 | 1/2011 | Buzyn et al. | |
| 2011/0070453 A1 | 3/2011 | Mai et al. | |
| 2011/0148218 A1 | 6/2011 | Rozbicki | |
| 2012/0122066 A1 | 5/2012 | Dohring et al. | |
| 2012/0170836 A1 | 7/2012 | Henry et al. | |
| 2013/0004678 A1 | 1/2013 | Krasnov et al. | |
| 2013/0121608 A1 | 5/2013 | Winnemoeller et al. | |
| 2014/0157210 A1 | 6/2014 | Katz et al. | |
| 2014/0191771 A1 | 7/2014 | Nam et al. | |
| 2014/0231625 A1 | 8/2014 | Chang et al. | |
| 2014/0304265 A1 | 10/2014 | Topakas et al. | |
| 2014/0360663 A1 | 12/2014 | Lee et al. | |
| 2015/0009420 A1 | 1/2015 | Zhou | |
| 2015/0116346 A1 | 4/2015 | Somerville et al. | |
| 2015/0212785 A1 | 7/2015 | Chiba et al. | |
| 2015/0331970 A1 | 11/2015 | Jovanovic | |
| 2016/0033792 A1 | 2/2016 | Blum et al. | |
| 2016/0275702 A1 | 9/2016 | Reynolds et al. | |
| 2017/0074652 A1 | 3/2017 | Send et al. | |
| 2017/0124370 A1 | 5/2017 | He et al. | |
| 2017/0150001 A1 | 5/2017 | Chapman | |
| 2017/0161822 A1 | 6/2017 | Crogan et al. | |
| 2017/0242570 A1 | 8/2017 | Beymore et al. | |
| 2018/0081481 A1 | 3/2018 | Fournier et al. | |
| 2018/0125605 A1 | 5/2018 | Kim-Whitty | |
| 2018/0300023 A1 | 10/2018 | Hein | |
| 2018/0321425 A1 | 11/2018 | Hart et al. | |
| 2019/0034020 A1 | 1/2019 | He et al. | |
| 2019/0080341 A1 | 3/2019 | Eilenberger et al. | |
| 2019/0114727 A1 | 4/2019 | Spath | |
| 2019/0138168 A1 | 5/2019 | Mckers et al. | |
| 2019/0149808 A1 | 5/2019 | Ng et al. | |
| 2019/0272712 A1 | 9/2019 | Taya | |
| 2019/0287303 A1 | 9/2019 | Falstrup et al. | |
| 2020/0035024 A1 | 1/2020 | Price et al. | |
| 2021/0406974 A1 | 12/2021 | Minchew et al. | |
| 2022/0237832 A1* | 7/2022 | Williams .............. G06T 11/001 |

FOREIGN PATENT DOCUMENTS

| | | |
|---|---|---|
| DE | 0441032 C | 2/1927 |
| DE | 102011014853 A1 | 9/2012 |
| EP | 0484564 A1 | 5/1992 |
| GB | 2434227 A | 7/2007 |
| JP | 53-061054 U | 5/1978 |
| WO | 98/39915 A1 | 9/1998 |
| WO | 99/10767 A1 | 3/1999 |
| WO | 2007/053710 A2 | 5/2007 |
| WO | 2013082009 A1 | 6/2013 |
| WO | 2017/188470 A1 | 11/2017 |

OTHER PUBLICATIONS

Office Action received for Australian Patent Application No. 2021376041, mailed on Sep. 4, 2023, 4 pages.
Office Action received for Australian Patent Application No. 2021376041, mailed on Mar. 13, 2024, 4 pages.

* cited by examiner

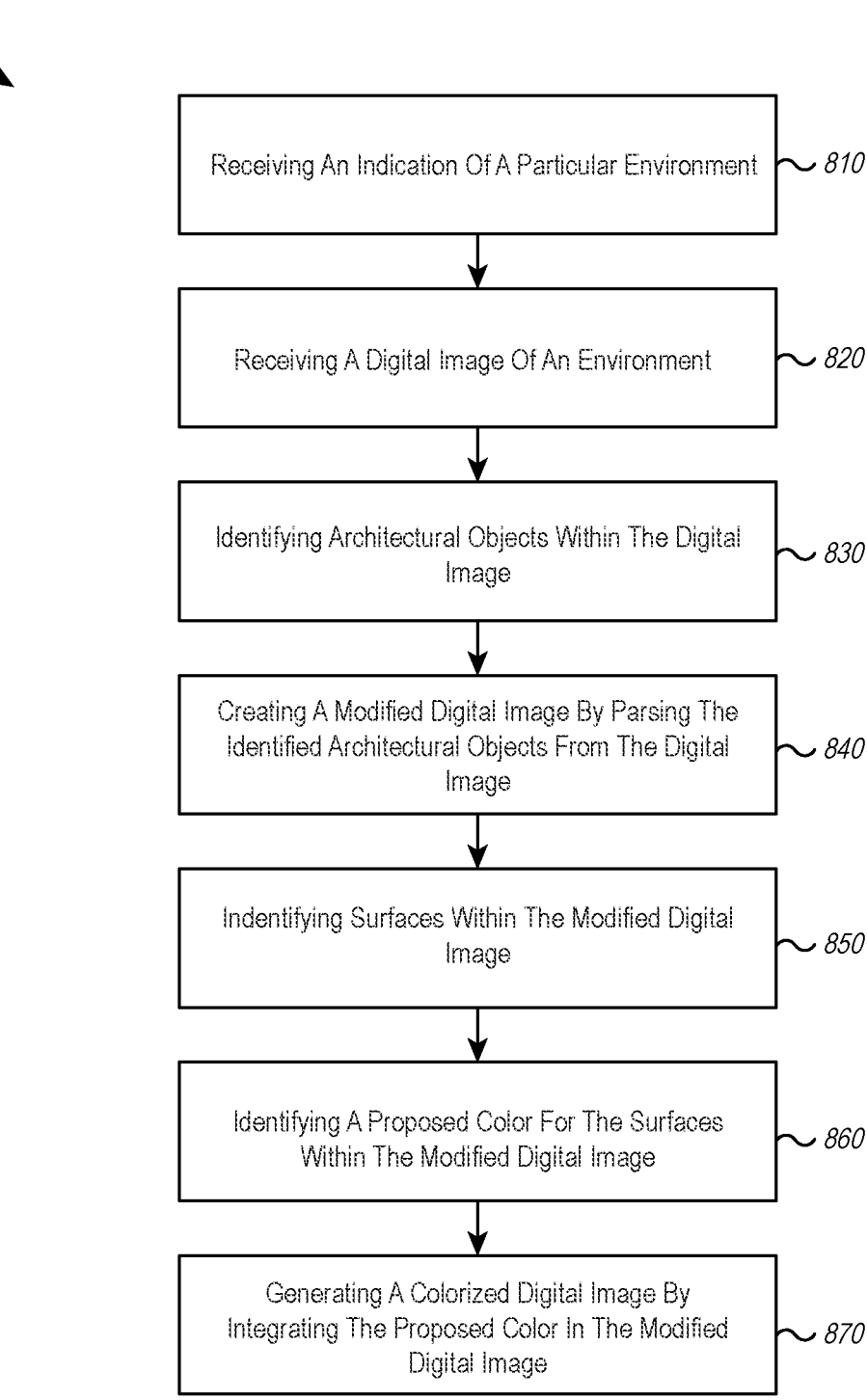

*800*

Receiving An Indication Of A Particular Environment — *810*

Receiving A Digital Image Of An Environment — *820*

Identifying Architectural Objects Within The Digital Image — *830*

Creating A Modified Digital Image By Parsing The Identified Architectural Objects From The Digital Image — *840*

Indentifying Surfaces Within The Modified Digital Image — *850*

Identifying A Proposed Color For The Surfaces Within The Modified Digital Image — *860*

Generating A Colorized Digital Image By Integrating The Proposed Color In The Modified Digital Image — *870*

*FIG. 8*

SYSTEMS, METHODS, AND INTERFACES FOR IDENTIFYING COATING SURFACES

BACKGROUND

Because most home construction, renovation, and decorating projects include a selection of paint colors for one or more surfaces within a room, many different systems and methods have been introduced to assist customers in selecting a particular coating for a project.

For example, a conventional method for selecting a desired coating may include a customer identifying a paint chip of interest at a paint store. The customer can choose to buy the paint simply based upon the chip itself. Alternatively, because customers tend to want to find a coating color that complements at least some existing home décor, the customer can choose to take the paint chip home and try to visualize the color from the paint chip applied to the target surface. One will understand the difficultly of picking a color based upon a conventional card sized paint chip.

In contrast, some more recent conventional methods allow a user to take a picture of an object and digitally retrieve color data from the object. This method can be particularly useful when the customer is attempting to match a coating to a previously coated surface that has been damaged. Additionally, this method may also be useful when the customer wants to coat a target surface with a particular color that the customer is otherwise unable to identify.

While convention paint selection methods provide several systems by which a customer can select a paint color, there are still significant shortcomings. Accordingly, there are many opportunities for new systems and methods that aid users in their selection of a paint color.

BRIEF SUMMARY

A computer system for dynamically parsing a digital image to identify coating surfaces comprises one or more processors and one or more computer-storage media having stored thereon executable instructions that when executed by the one or more processors configure the computer system to perform various actions. For example, the computer system can receive, through a network connection, a user-provided input comprising an indication of a particular environment and a user-provided digital image, wherein the digital image comprises a picture of an environment and one or more objects. The computer system can also identify, with an image recognition module, the one or more objects within the user-provided digital image. Additionally, the computer system can create a modified digital image by parsing the identified one or more objects from the user-provided digital image. In particular, the computer system can perform the computerized method as described herein.

A computerized method for use with a computer system comprising one or more processors and one or more computer-readable media having stored thereon executable instructions that when executed by the one or more processors configure the computer system to perform a method of dynamically parsing a digital image to identify coating surfaces. The method can comprise receiving, through a network connection, a user-provided input comprising an indication of a particular environment and a user-provided digital image, wherein the digital image comprises a picture of an environment and one or more objects. The method can also comprise identifying, with an image recognition module, the one or more objects within the user-provided digital image. Further, the method can include creating a modified digital image by parsing the identified one or more objects from the user-provided digital image. The method can also comprise identifying surfaces within the modified digital image and identifying at least one proposed color for the surfaces within the modified digital image. Additionally, the method can comprise generating a colorized digital image by integrating the at least one proposed color on at least one surface and integrating the parsed one or more objects in the modified digital image. In particular, the computerized method can be performed on computer system described herein.

A computer program product comprising one or more computer storage media having stored thereon computer-executable instructions that, when executed at a processor, cause the computer system to perform a method for dynamically parsing a digital image to identify coating surfaces. The method can comprise receiving, through a network connection, a user-provided input comprising an indication of a particular environment and a user-provided digital image, wherein the digital image comprises a picture of an environment and one or more objects. The method can also comprise identifying, with an image recognition module, the one or more objects within the user-provided digital image and creating a modified digital image by parsing the identified one or more objects from the user-provided digital image. The method can also comprise identifying surfaces within the modified digital image, and at least one proposed color for the surfaces within the modified digital image. Finally, the method can comprise generating a colorized digital image by integrating the at least one proposed color on at least one surface and integrating the parsed one or more objects in the modified digital image. In particular, the computer program can perform a computerized method as described herein.

Additional features and advantages will be set forth in the description which follows, and in part will be obvious from the description, or may be learned by practice. The features and advantages may be realized and obtained by means of the instruments and combinations particularly pointed out in the appended claims. These and other features will become more fully apparent from the following description and appended claims or may be learned by the practice of the examples as set forth hereinafter.

BRIEF DESCRIPTION OF THE DRAWINGS

In order to describe the manner in which the above recited and other advantages and features can be obtained, a more particular description briefly described above will be rendered by reference to specific examples thereof, which are illustrated in the appended drawings. Understanding that these drawings are merely illustrative and are not therefore to be considered to be limiting of its scope, the computer system for dynamically parsing a digital image to identify coating surfaces will be described and explained with additional specificity and detail through the use of the accompanying drawings in which:

FIG. 8 illustrates a flow chart of a series of acts in a method for dynamically parsing a digital image to identify coating surfaces.

DETAILED DESCRIPTION

Figure 1:
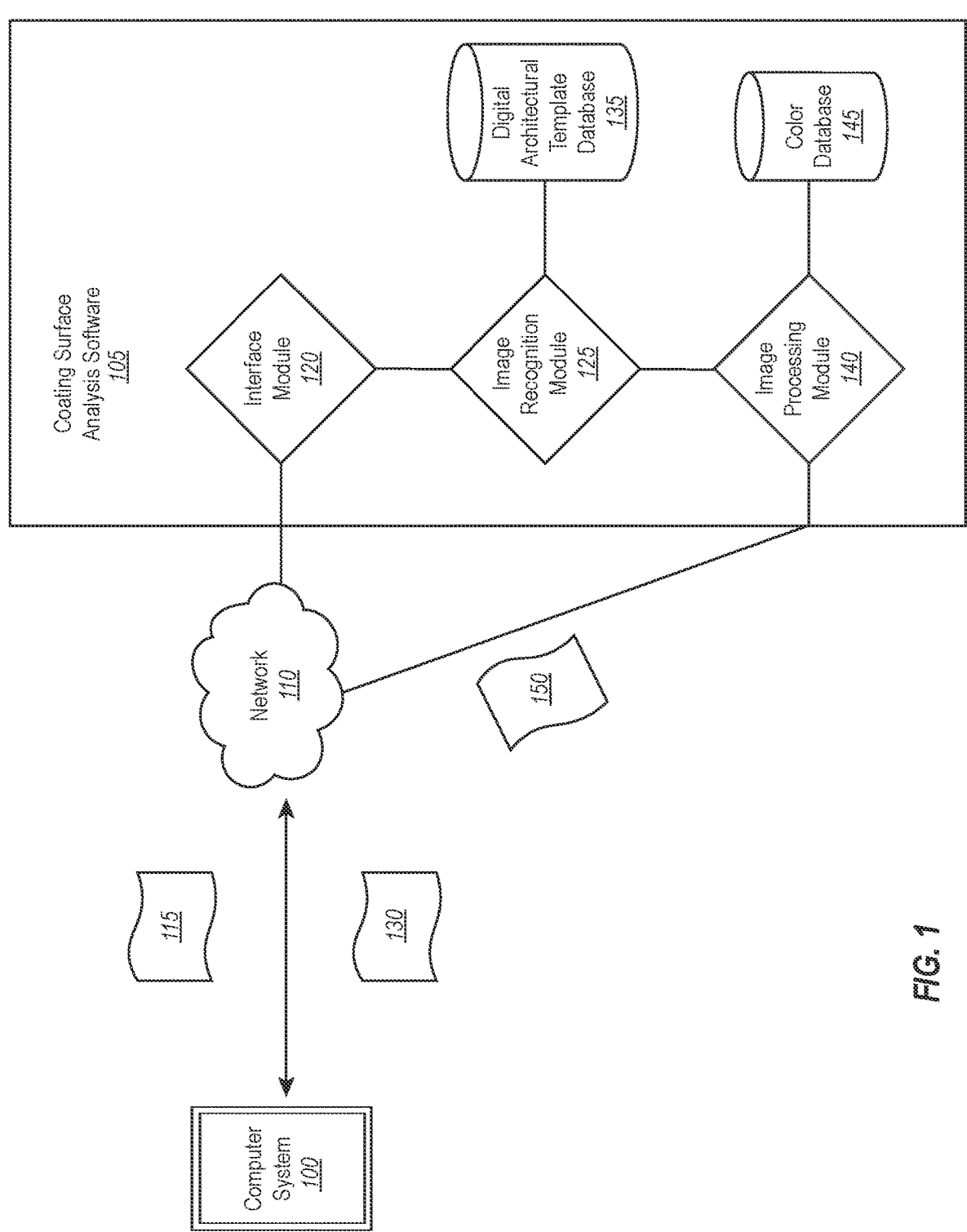
FIG. 1 depicts a schematic diagram of a network-based system for dynamically parsing a digital image to identify coating surfaces.

A computer system for dynamically parsing a digital image to identify coating surfaces a computer system can receive, through a network connection, a user-provided digital image and a user-provided input comprising an indication of an environment shown in the digital image and one or more objects. The environment can include a room, living room, bedroom, kitchen, bathroom, car, truck, house exterior, fence, boat, airplane, and other such environments. The computer system can also identify, with an image recognition module, one or more objects, such as architectural objects, within the user-provided digital image. Generally, the user-provided digital image is colored, in particular the objects and/or the environment are colored such as colored differently. As used herein, an object comprises any identifiable element within a digital picture other than the surface to be coated such as an "architectural object". For example, an "architectural object" comprises furniture, wall coverings, decorations, and other similar object that are commonly present within a room. Throughout this description for the sake of simplicity and clarity "architectural objects" may be used to provide examples and explanation relating to a computer system for dynamically parsing digital images to identify coating surfaces. Nevertheless, one will appreciate that the described inventions are not limited to the use of "architectural objects" but can also extend to other types of objects including but not limited to automotive objects, landscape objects, and fixture objects.

The computer system can create a modified digital image by parsing the identified one or more objects from the user-provided digital image and identifying surfaces within the modified digital image. The computer system can also identify at least one proposed color for the surfaces within the modified digital image. Finally, the computer system can generate a colorized digital image by integrating the at least one proposed color on at least one surface and integrating the parsed one or more objects in the modified digital image.

As such, the computer system can provide several benefits to the art. For example, although painting a room is one of the less expensive aspects of a home construction, renovation, or decorating projects, it can carry a negative connotation as being overwhelming and/or labor intensive. The computer system may resolve a portion of the negativity associated with painting a room, as it may help a user narrow paint options from an overwhelming number to only a few suggested options.

Additionally, as opposed to using a single paint chip and trying to mentally visualize the presence of the paint chip color on a surface in a room, the computer system may allow a user to upload a picture of the room, and dynamically view various coating colors in the picture of the room. The user may also adjust colors in the room with natural language commands such as "darker," "brighter," "more earthy," "less vibrant," etc. The computer system may further identify one or more architectural objects within the picture of the room. The computer system can then extract colors from at least one of the identified architectural objects and use that color as a basis for suggesting complementary or matching colors.

For example, the computer system may identify the architectural object that is the user's bed. The user's bed may be a painted particular color of blue. The computer system can provide the user with various colors that match or complement the particular color of blue. Additionally, a user may be able to indicate to the computer system which architectural object the computer system should analyze for matching or complementary paint. For example, the user may select a favorite painting on a wall of the room that is visible in the picture.

Further the computer system may analyze color from multiple architectural objects identified in the picture. The computer system then proposes paint colors that match or complement the largest number of architectural elements from the picture. Alternatively, the computer system may categorize and rank the architectural objects based on a likelihood that the user may wish to match a paint color to the architectural object. For example, the computer may track user inputs over time and identify which architectural objects are commonly used to generate paint suggestions and which architectural objects are less commonly used. For instance, the computer system may determine that users often match paint to a couch in a living room but rarely match paint to pictures on the wall of the living room. Using this information, the computer system can automatically suggest colors that match a couch, while ignoring colors that may match pictures on the walls. As such, the computer system can provide users with significant assistance in selecting colors for a room.

Turning now to the figures, FIG. 1 illustrates a schematic of a computerized system for dynamically parsing a digital image to identify coating surfaces. As shown, a computer system 100 is in communication with a coating surface analysis software 105 through a network connection 110. One skilled in the art will appreciate that the depicted schematic is merely exemplary, and although the computer system 100 is depicted in FIG. 1 as a mobile phone, the computer system 100 can take a variety of forms. For example, the computer system 100 may be a laptop computer, a tablet computer, a wearable device, a desktop computer, a mainframe, etc. As used herein, the term "computer system" includes any device, system, or combination thereof that includes one or more processors, and a physical and tangible computer-readable memory capable of having thereon computer-executable instructions that are executable by the one or more processors.

The one or more processors may comprise an integrated circuit, a field-programmable gate array (FPGA), a microcontroller, an analog circuit, or any other electronic circuit capable of processing input signals. The memory may be physical system memory, which may be volatile, non-volatile, or some combination of the two. The term "memory" may also be used herein to refer to non-volatile mass storage such as physical storage media. Examples of computer-readable physical storage media include RAM, ROM, EEPROM, solid state drives ("SSDs"), flash memory, phase-change memory ("PCM"), optical disk storage, magnetic disk storage or other magnetic storage devices, or any other hardware storage device(s). The computer system 100 may be distributed over a network environment and may include multiple constituent computer systems.

The computer system 100 can comprise one or more computer-readable storage media having stored thereon executable instructions that when executed by the one or more processors configure the computer system 100 to execute the coating surface analysis software 105. The coating surface analysis software 105 may comprise various modules, such as an interface module 120, an image recognition module 125, and an image processing module 140. As used herein, a module may comprise a software component, including a software object, a hardware component, such as a discrete circuit, a FPGA, a computer processor, or some combination of hardware and software.

One will understand, however, that separating modules into discrete units is at least somewhat arbitrary and that modules can be combined, associated, or separated in ways other than shown in FIG. 1 and still accomplish the purposes of the computer system. Accordingly, the modules 120, 125, and 140 of FIG. 1 are only shown for illustrative and exemplary purposes.

The coating surface analysis software 105 may also be in communication with one or more databases. For example, the coating surface analysis software 105 may be in communication with a digital architectural template database 135 and a color database 145. As used herein, a database may comprise locally stored data, remotely stored data, data stored within an organized data structure, data stored within a file system, or any other stored data that is accessible to the coating surface analysis software 105. Additionally, as used herein a digital architectural template comprises a digital description of the physical, viewable characteristics of a particular piece of furniture. In some cases, the digital architectural templates may comprise labelled data relating to architectural objects that can be loaded into a neural network. For example, a digital architectural template may describe a chair. The digital architectural template may be processed by loading a labelled picture of the chair into a neural network. Alternatively, the chair may be described by storing a digital architectural template in the form of a digital visual description of the chair that is useable by a computer system for identifying a chair within an image.

Additionally, or alternatively, a digital architectural template may be associated with metadata that describes various aspects of the underlying architectural objects. The metadata may describe design schemes that are associated with the architectural objects. For example, the architectural object may comprise a particular style of chair. The metadata may describe the particular style and further provide information relating to the types and colors of paints that are commonly associated with the particular style.

For instance, the metadata may describe a particular chair as having a mid-century modern style. Further information, based on the chair's categorization as mid-century modern, such as common or popular mid-century modern color palettes, may be stored in the digital architectural template database 135, and be used by the coating surface analysis software 105 when identifying a proposed color for a surface within the modified digital image.

The coating surface analysis software 105 may be configured to receive a digital image of an environment 115, identify, with an image recognition module 125, one or more objects within the user-provided digital image, and create a modified digital image by parsing the objects from the digital image of the environment 115. The coating surface analysis software 105 may also be configured to identify surfaces within the modified digital image, access a color database 145, identify a proposed color for a surface within the modified digital image, and generate a colorized digital image 150 by integrating the proposed color on at least one surface and integrating the parsed objects in the modified digital image.

For example, from the computer system 100 through the network connection 110, the user may upload a digital image of an environment 115 to the coating surface analysis software 105. The interface module 120 may provide an interface for selecting a digital image available to the user and uploading the digital image into the image recognition module 125. The user may also send the coating surface analysis software 105 an indication of what environment is shown in the digital image 130. The interface module 120 may allow a user to select the environment type from a predefined list. For example, the predefined list may comprise selections such as bedroom, kitchen, bathroom, car, truck, house exterior, fence, boat, airplane, and other such environments. Additionally, or alternatively, the interface module 120 may allow the user to type, speak, or otherwise identify the environment, and the interface module 120 may then identify the environment based on the user input.

The image recognition module 125 may use the indication of what type of environment is shown in the digital image 130 to access a particular digital template database. For example, if the environment type is a bedroom, then the image recognition module 125 may access, within a digital architectural template database 135, a database subset for the particular environment of digital architectural templates. For example, the digital architectural template database 135 may comprise a database subset for a bedroom which comprises digital architectural templates of architectural objects commonly found in a bedroom. The database subset for a bedroom may include digital architectural templates for various types or beds, dressers, armoires, wall hangings, desks, etc.

The digital architectural template database 135 may include database subsets that are further organized based on information provided by the user or information obtained about the user. For example, the digital architectural template database 135 may comprise a geographic look-up table that comprises digital architectural templates in association with various geographic regions. The computer system 100 may gather the user's geographic location using location services such as IP address localization and/or GPS localization services. Additionally, or alternatively, the computer system 100 may gather the user's geographic location from a pre-loaded user profile associated with a particular user's account or through a user input into the interface module 120. Therefore, a database subset of digital architectural templates based on the geographic data about the user may be generated.

Similarly, the digital architectural template database 135 may comprise an age look-up table that comprises digital architectural templates in association with various ages. The computer system 100 may gather the user's age from a pre-loaded user profile associated with a particular user's account or through a user input into the interface module 120. Therefore, a database subset of digital architectural templates based on the age of the user may be generated.

The image recognition module 125 may also be configured to map digital architectural templates from the database subset to architectural objects within the digital image of the environment 115. The digital architectural templates may comprise simplified line drawings of architectural objects. The image recognition module 125, therefore, may map the digital architectural templates to the architectural objects in the digital image of the environment 115 by line matching. The image recognition module 125 may also be configured to automatically adjust the size of the digital architectural templates to align with the architectural objects in the digital image of the environment 115.

Additionally, or alternatively, the image recognition module 125 may comprise a machine learning algorithm that is configured to identify architectural objects within the digital image of the environment 115. The machine learning algorithm may be taught using annotated digital architectural templates stored within the digital architectural template database 135. In some cases, the machine learning algorithm may also map the identified architectural objects to digital architectural templates within the digital architectural template database 135. The machine learning algorithm may comprise any number of different object recognition and object classification algorithms, including a convolutional neural network. Information can then be gathered from the metadata associated with the digital architectural template.

After the digital architectural templates are mapped to the architectural objects within the digital image of the environment 115, an image processing module 140 can create a modified digital image by parsing the identified architectural objects from the digital image of the environment 115. The image processing module 140 may also identify surfaces within the modified digital image. For example, the image processing module 140 may identify certain surfaces as walls, another as a ceiling, and another as the floor. The image processing module 140 may also identify various exterior surfaces. The image processing module 140 may be further configured to distinguish wall trim and wall treatments from a wall.

The image processing module 140 may also access a color database 145 and identify a proposed color for a surface within the modified digital image. By integrating the proposed color on at least one surface and integrating the parsed objects in the modified digital image, the image processing module 140 may also generate a colorized digital image 150. The image processing module 140 may include a user interface component that allows the user to view various color options and select the proposed color from the color options. As used herein, "proposed color" may comprise one or more colors, including various shades of the same color, color palettes, matching colors, or complementary colors.

The user interface component of the image processing module 140 may allow the user to view and adjust the color options within the colorized digital image 150 with natural language commands such as "change wall color to option 2," "make the ceiling the gray option," etc. The user may also adjust the color options with natural language commands such as "darker," "brighter," "more earthy," "less vibrant," etc. The user interface component of the image processing module 140 may allow the user to type, speak, or otherwise communicate their command. Further, the user interface component may provide details (e.g., a link or web address) where and how the user may purchase the proposed color from a paint manufacturer.

Additionally, the interface module 120 or the user interface component of the image processing module 140 may use additional input from the user to narrow or tailor color options. For example, the interface module 120 or the user interface component of the image processing module 140 may allow the user to choose from various broad-concept design options, and progressively narrow color options based on the user's responses. The interface module 120 or the user interface component of the image processing module 140 may provide the user with stock photos of design options from which the user can choose preferred design features and color options.

Additionally, or alternatively, the user interface component of the image processing module 140 may allow the user to view color options, and either swipe right to select the displayed color option, or swipe left to pass on the displayed color option. Selected color options from swiping may be used to select the proposed color for at least one surface in the colorized digital image 150.

Additionally, or alternatively, the user may upload a photo with specific design features the user would like to include in their colorized digital image 150 (e.g., a particular wall color or treatment). The interface module 120 or the user interface component of the image processing module 140 may allow the user to identify what design feature in the photo they would like included in their colorized digital image 150. The image processing module 140 may identify the design feature within the photo and search within the color database 145 for the closest match.

Further, the image processing module 140 may provide additional design suggestions based on the colorized digital image 150. For example, when providing additional design suggestions based on the colorized digital image 150, the image processing module 140 may identify an additional proposed color for an architectural object within the digital image of the environment 115. Additionally, or alternatively, the image processing module 140 may identify a color of a parsed architectural object within the digital image of the environment 115 and generate the proposed color based on the identified color of the parsed architectural object.

The image processing module 140 may also generate a proposed color based on permanence attributes and identified colors associated with the architectural objects in the digital image of the environment 115. For example, the image processing module 140 may first organize the architectural objects by their permanence attributes with respect to the environment. As used herein "permanence attributes" are associate with the cost and/or labor associated with altering the architectural object. For example, one will appreciate that a fireplace may have a high permanence attribute while curtains may have a low permanence attribute.

The permanence attributes may be associated with the mapped digital architectural templates, and therefore be stored in the metadata within the digital architectural template database 135. The image processing module 140 may access the permanence attributes stored in the digital architectural template database 135 indirectly through the image recognition module 125, or the image processing module 140 may access the digital architectural template database 135 directly.

As described above, the image processing module 140 may identify a color of a parsed architectural object within the digital image of the environment 115 and generate the proposed color based on the identified color of the parsed architectural object. However, the image processing module 140 may also consider the permanence attributes of the architectural objects when generating the proposed color. The proposed color may be suggested based on how well it complements the most architectural objects with the highest permanence attributes. For example, the image processing module may prioritize generating a proposed color that complements the fireplace over a proposed color that complements the curtains.

The user interface component of the image processing module 140 may allow the user to identify a focal point for the environment from which the proposed color may be suggested based on how well it complements the focal point. For example, the user may identify a painting as a focal point for the environment. The image processing module 140 may prioritize generating a proposed color that complements the painting over a proposed color that complements other architectural objects, even architectural objects with higher permanence attributes.

Additionally, or alternatively, the image processing module 140 may generate the proposed color based on geographic data about the user. The geographic data about the user may be provided by the user. For example, the interface module 120 may provide an interface by which the user can enter geographic data. The image processing module 140 may also provide a user interface component by which the user can enter geographic data. The coating surface analysis software 105 may also use location services on the user's computing system to obtain geographic data about the user.

After obtaining geographic data about the user, the image processing module 140 may access a color-geographic look-up table that comprises data on color prevalence in association with various geographic regions. The color-geographic look-up table may be stored in the color database 145.

Further, the image processing module 140 may identify correlations between the color-geographic look-up table and a digital architectural template look-up table that comprises color prevalence in association with the database subset of the digital architectural templates based on the data about the age of the user. After obtaining geographic data about the user, the image processing module 140 may access the color-geographic look-up table and the digital architectural template look-up table, identify correlations between the color-geographic look-up table and the digital architectural template look-up table, and then generate a proposed color based on the identified correlations. The digital architectural template look-up table may be stored in the color database 145.

The image processing module 140 may also generate the proposed color based on data about the age of the user. The data about the age of the user may be provided by the user. For example, the interface module 120 may provide an interface by which the user can enter their age or age range. The image processing module 140 may also provide a user interface component by which the user can enter age-related data. After obtaining the data about the age of the user, the image processing module 140 may access a color-age look-up table that comprises data on color prevalence in association with various ages. The color-age look-up table may be stored in the color database 145.

The image processing module 140 may identify correlations between the color-age look-up table and a digital architectural template look-up table that comprises color prevalence in association with the database subset of the digital architectural templates based on the data about the age of the user. After obtaining data about the age of the user, the image processing module 140 may access the color-age look-up table and the digital architectural template look-up table, identify correlations between the color-age look-up table and the digital architectural template look-up table, and then generate a proposed color based on the identified correlations.

FIG. 1 also shows that the image processing module 140 may be in communication with the computer system 100 via the network connection 110. As shown, the image processing module may send the computer system 100 rendering instructions for the colorized digital image 150 via the network connection 110.

Figure 2:
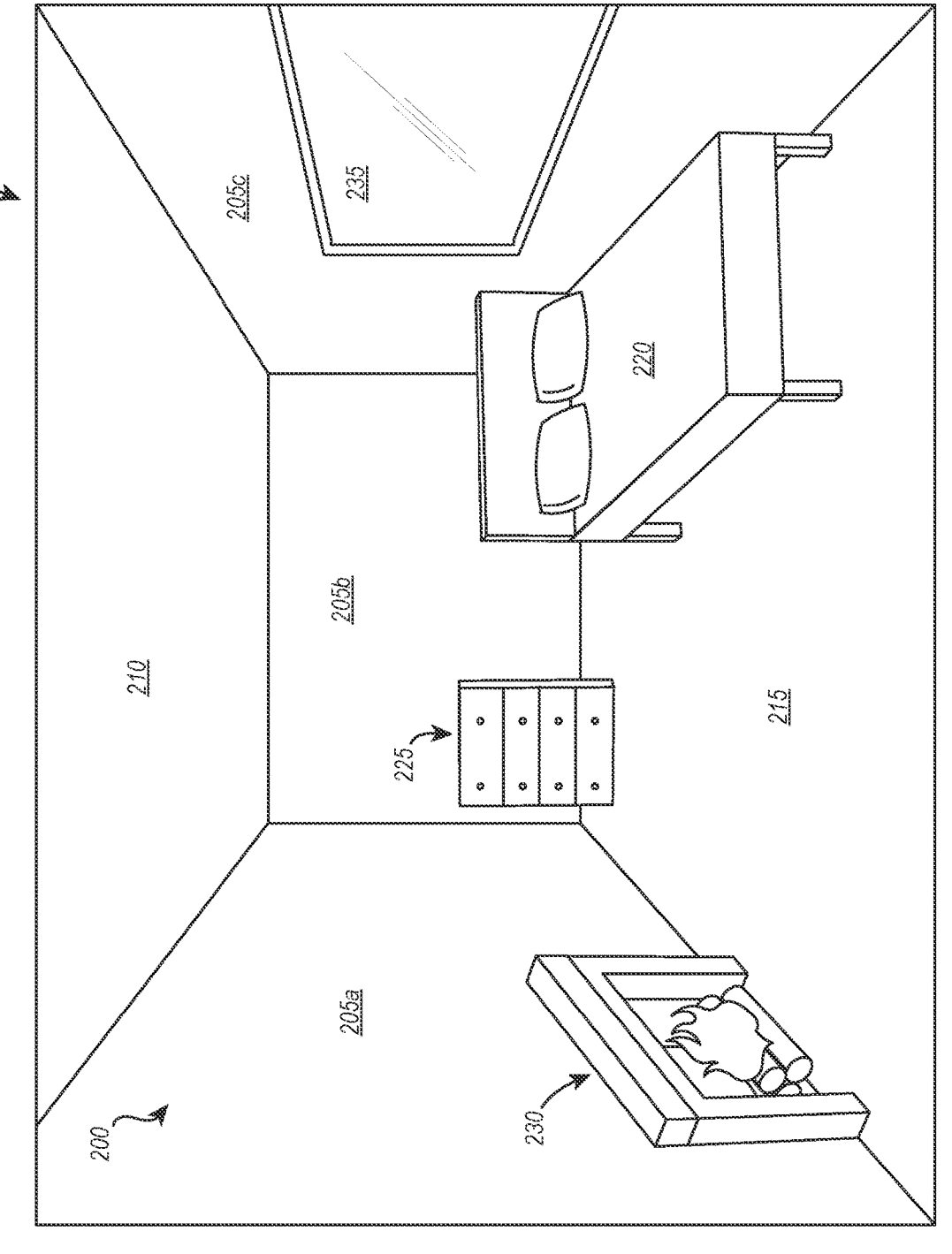
FIG. 2 depicts an exemplary digital image of a bedroom provided by a user.

FIG. 2 depicts a digital image of an environment 115. The digital image of the environment 115 comprises a bedroom 200 with three walls 205a-205c, a ceiling 210, a floor 215. The bedroom 200 also comprises various architectural objects, including a bed 220, a dresser 225, a fireplace 230, and a hung mirror 235. The digital image of the environment 115 depicted in FIG. 2 is merely illustrative, and the digital image of the environment 115 may vary greatly from user-to-user and project-to-project. For example, although the digital image of the environment 115 shown in FIG. 2 shows an interior room with three walls 205a-205c, the digital image of the environment 115 may be from a viewpoint within the interior room that shows more or less than three walls. The digital image of the environment 115 may comprise an image from any viewpoint of an interior or exterior environment. Further, the digital image of the environment 115 is not limited to the architectural objects shown in FIG. 2.

Figure 3:
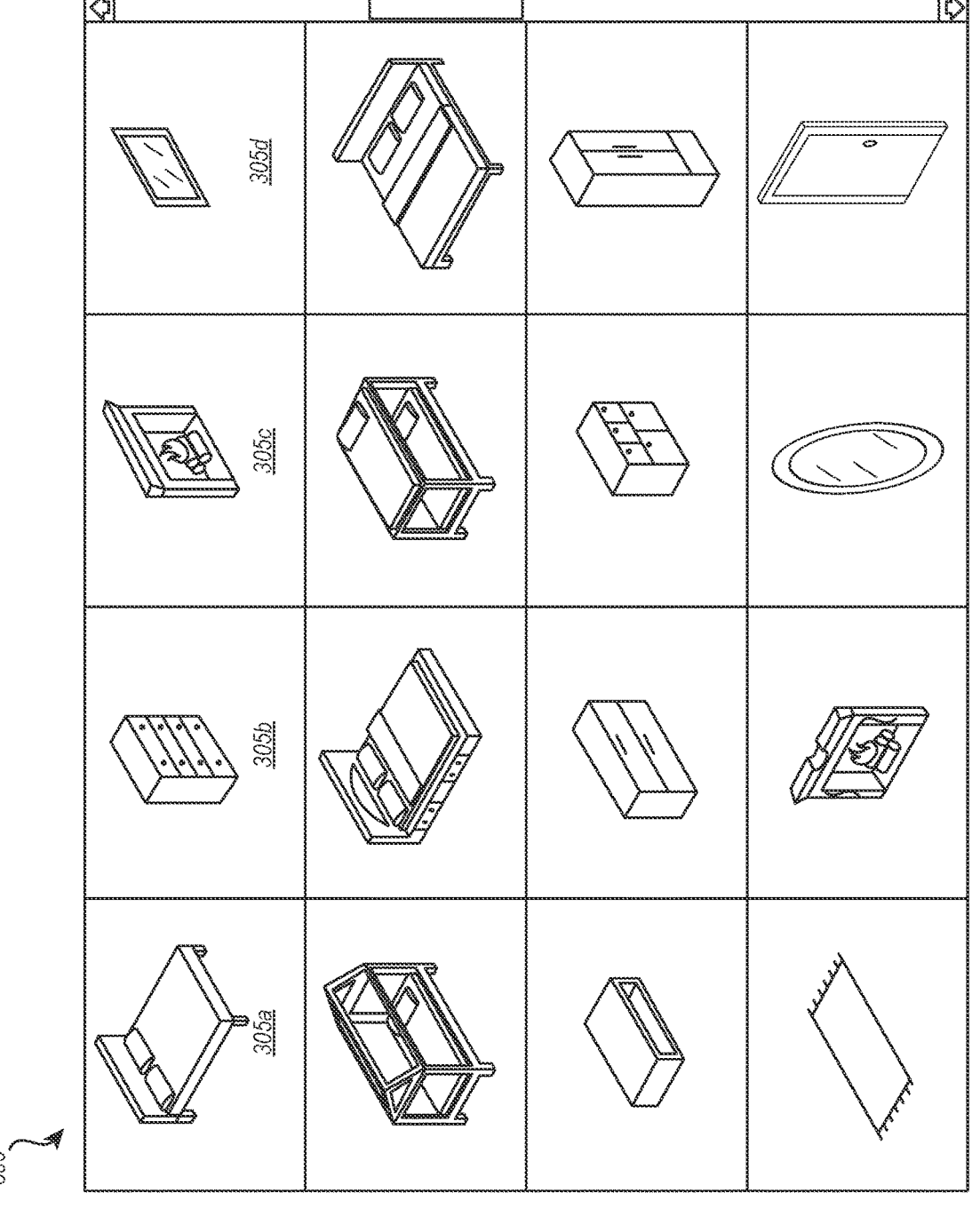
FIG. 3 depicts an exemplary bedroom database subset comprising digital architectural templates

FIG. 3 depicts a portion of a bedroom database subset 300 that may be stored in the digital architectural template database 135. As shown, the bedroom database subset 300 includes digital architectural templates 305a-305d of types of architectural objects that may be in a bedroom. For example, the bedroom database subset 300 includes a bed with a headboard digital architectural template 305a, a dresser digital architectural template 305b, a fireplace digital architectural template 305c, and a rectangular mirror digital architectural template 305d. The types and number of digital architectural templates 305a-305d shown in FIG. 3 are merely illustrative.

Figure 4:
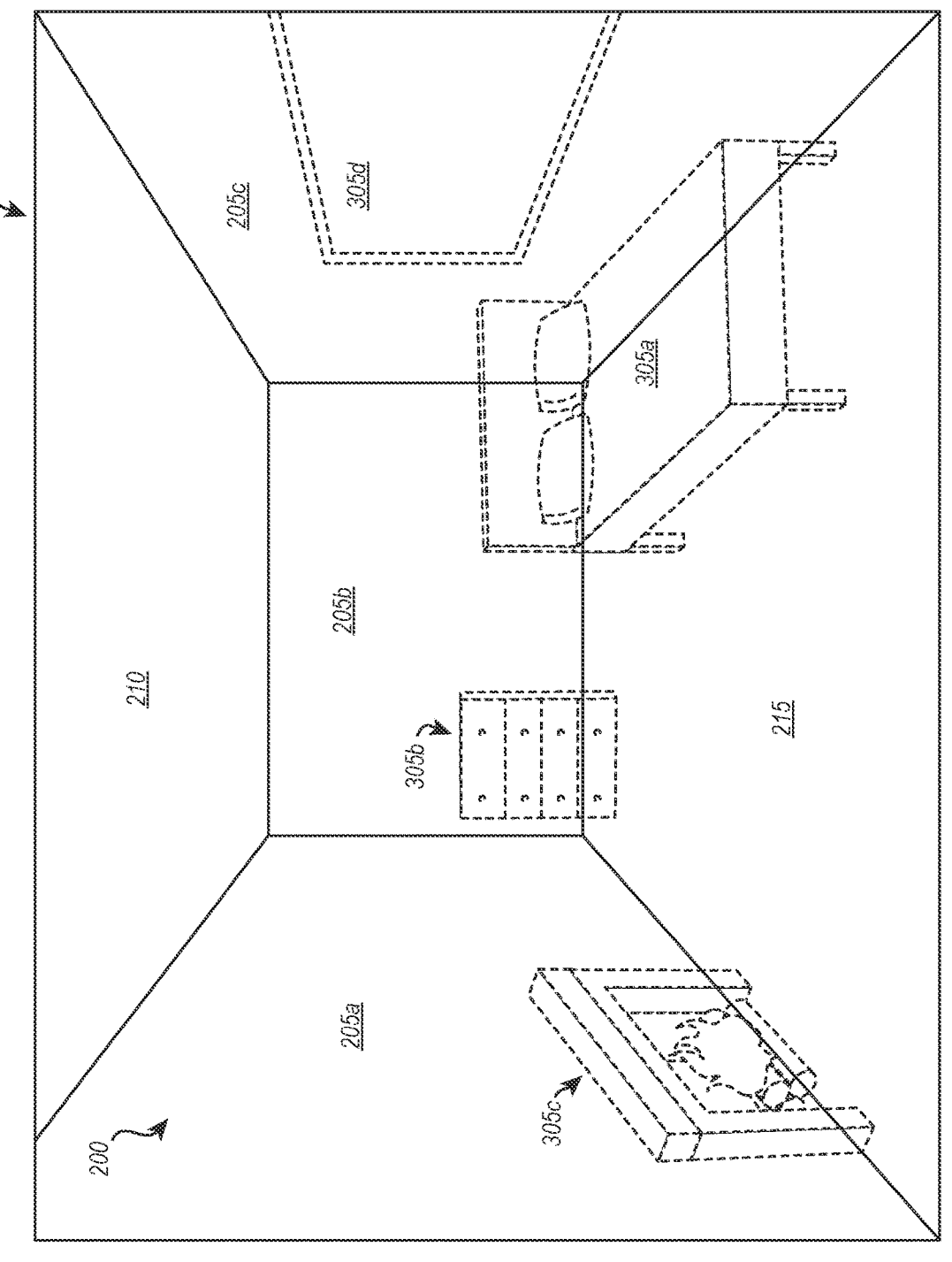
FIG. 4 depicts the exemplary digital image of the bedroom shown in FIG. 2, wherein digital architectural templates are mapped to the architectural objects in the bedroom.

FIG. 4 shows a digital image of an environment 115 (a room) wherein the digital architectural templates 305a-305d from the bedroom database subset 300 have been mapped to corresponding architectural objects within the bedroom 200. For example, the bed with a headboard digital architectural template 305a has been mapped over the bed 220. As described above, the image recognition module 125 may map the digital architectural templates 305a-305d to the architectural objects in the digital image of the environment 115 by line matching. The image recognition module 125 may also be configured to automatically adjust the size of the digital architectural templates 305a-305d to align with the architectural objects in the digital image of the environment 115.

Figure 5:
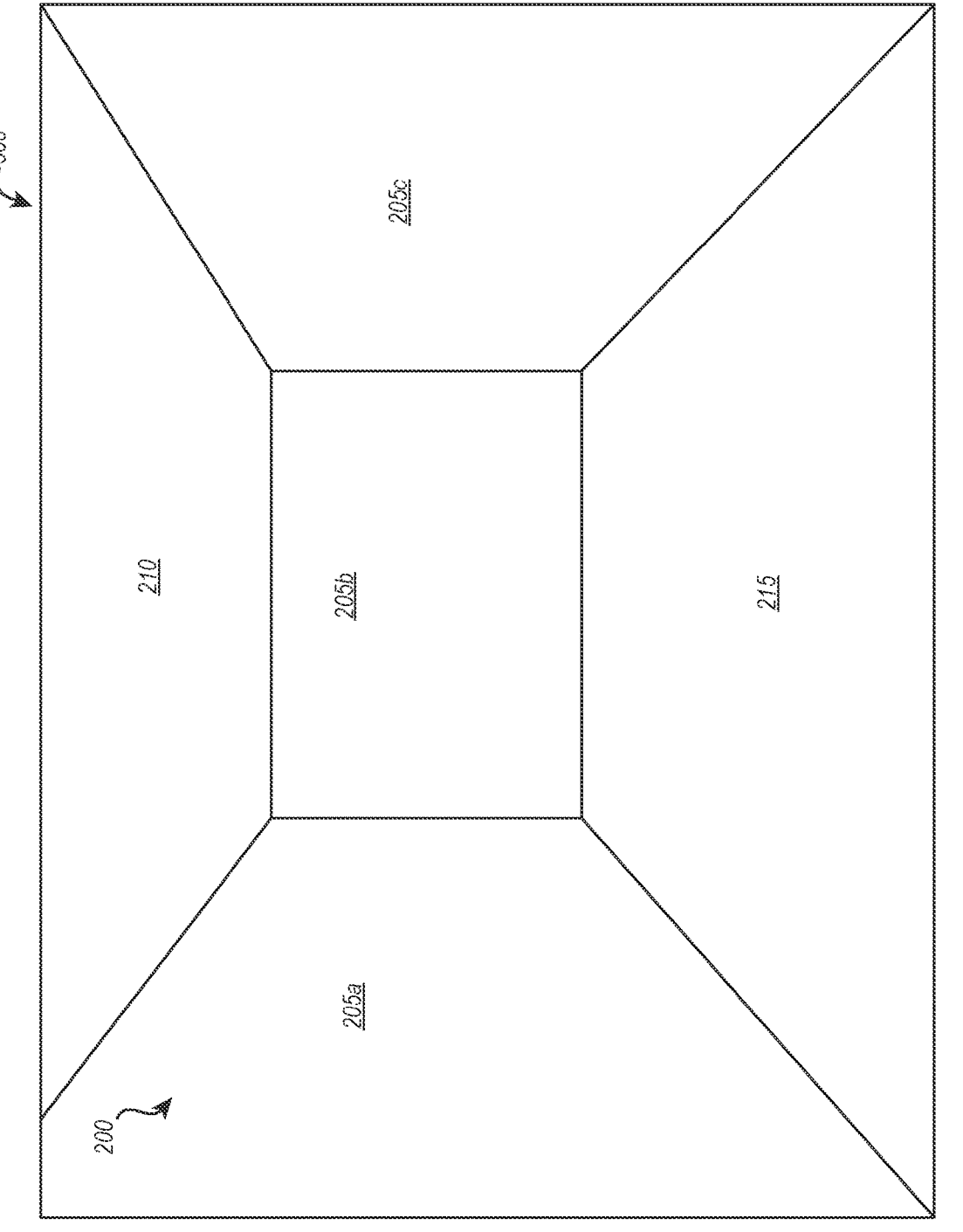
FIG. 5 depicts the exemplary modified digital image of the bedroom shown in FIGS. 2 and 4, wherein mapped architectural objects have been parsed from the digital image of the bedroom.

Once the digital architectural templates 305a-305d are mapped to architectural objects in the digital image of the environment 115, the image processing module 140 may create a modified digital image 500 by parsing the identified architectural objects from the digital image of the environment 115, as shown in FIG. 5. As shown, the digital architectural templates 305a-305d and their corresponding architectural objects have been removed from the modified digital image 500. The image processing module 140 may identify surfaces within the modified digital image 500. For example, the image processing module 140 may identify certain surfaces as walls 205a-205c, another as a ceiling 210, and another as the floor 215. The image processing module 140 may also access a color database 145 and identify a proposed color for a surface within the modified digital image 500.

Figure 6B:
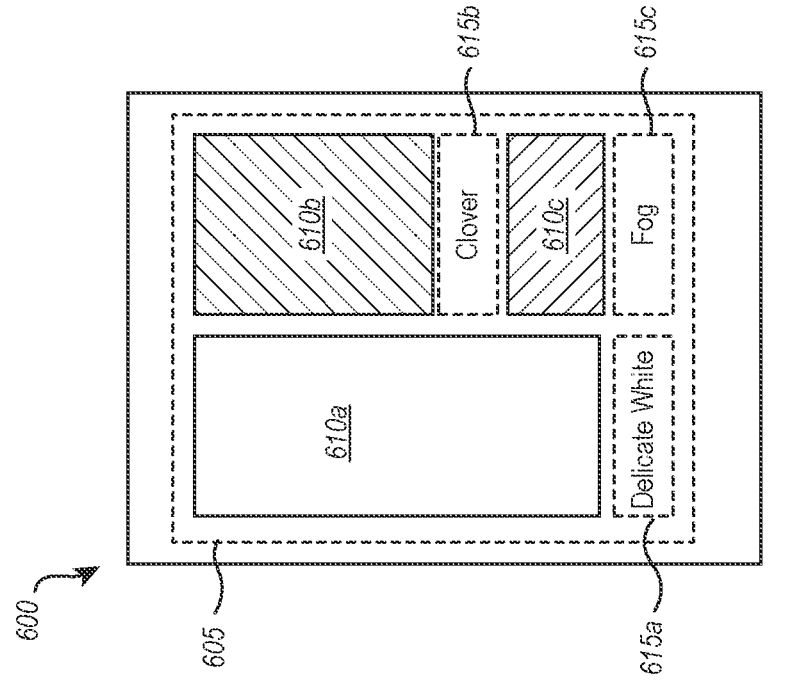
FIG. 6B depicts alternative exemplary rendered display instructions sent from the image processing module to a touchscreen device wherein a user may view color options.
Figure 6B:
Figure 6A:
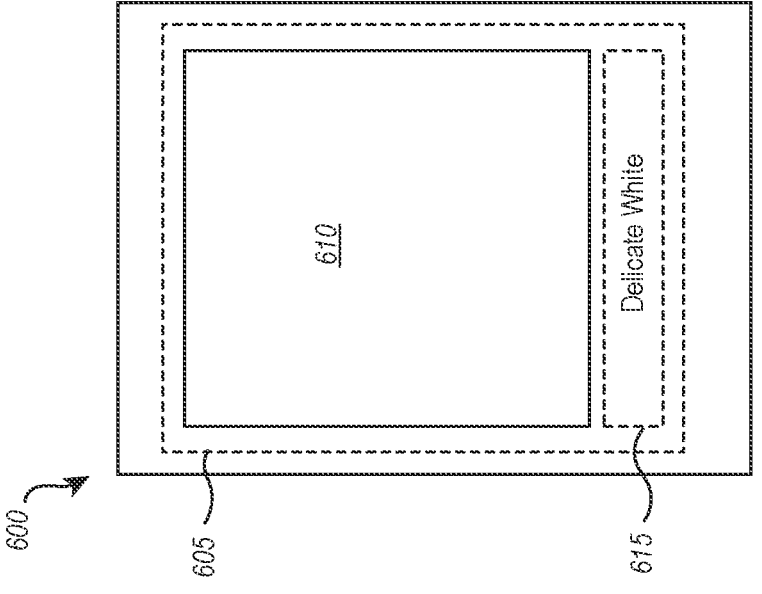
FIG. 6A depicts exemplary rendered display instructions sent from the image processing module to a touchscreen device wherein a user may view color options.

FIGS. 6A and 6B depict exemplary rendered display instructions sent from the user interface component of the image processing module 140 to a touchscreen device 600 (mobile phone, laptop computer, a tablet computer, etc.), wherein the user may view color options. More specifically, FIG. 6A shows that a user may use the touchscreen device 600 to view a color option 610 within display area 605. The display area 605 may also include an identification area 615 wherein the name of the paint and any other information related to the color option 610 is displayed. The touchscreen device 600 may be configured such that the user can swipe right to select the displayed color option 610, or swipe left to pass on the displayed color option 610. Selected color options from swiping may be used to select the proposed color for at least one surface in the colorized digital image 150. If the user passes on the displayed color option 610, a new color option may be shown in the display area 605.

Similarly, FIG. 6B shows a display area 605 on a touchscreen device 600. However, multiple color options 610a-610c, and multiple corresponding identification areas 615a-615c are shown in the display area 605 in FIG. 6B. The touchscreen device 600 may be configured such that the user can swipe right to select the multiple displayed color options 610a-610c, or swipe left to pass on the multiple displayed color options 610a-610c. Although three color options 610a-610c are shown in FIG. 6B, any number of color options may be displayed to the user. Selected color options from swiping may be used to select the proposed color for at least one surface in the colorized digital image 150. If the user passes on the displayed color options 610a-610c, new color options may be shown in the display area 605.

Additionally, when displaying multiple color options 610a-610c, the touchscreen device 600 may be configured to allow the user to switch one of the displayed color options 610a-610c for an alternative color option. For example, a user may like color options 610a and 610b, but wish to see more choices for color option 610c. The touchscreen device 600 may be configured such that the user can select color option 610c, and an alternative color option will replace color option 610c. The alternative color option may be selected from the same color family as color option 610c (e.g., whites, grays, greens, etc.).

Rather than displaying color options 610 as color swatches, as shown in FIGS. 6A and 6B, the touchscreen device 600 may be configured to show a preview of the colorized digital image 150 with the color options 610 integrated. For example, the display area 605 may show the digital image of an environment 115 with one or more color options 610 on at least one surface of the digital image of an environment 115.

Figure 7:
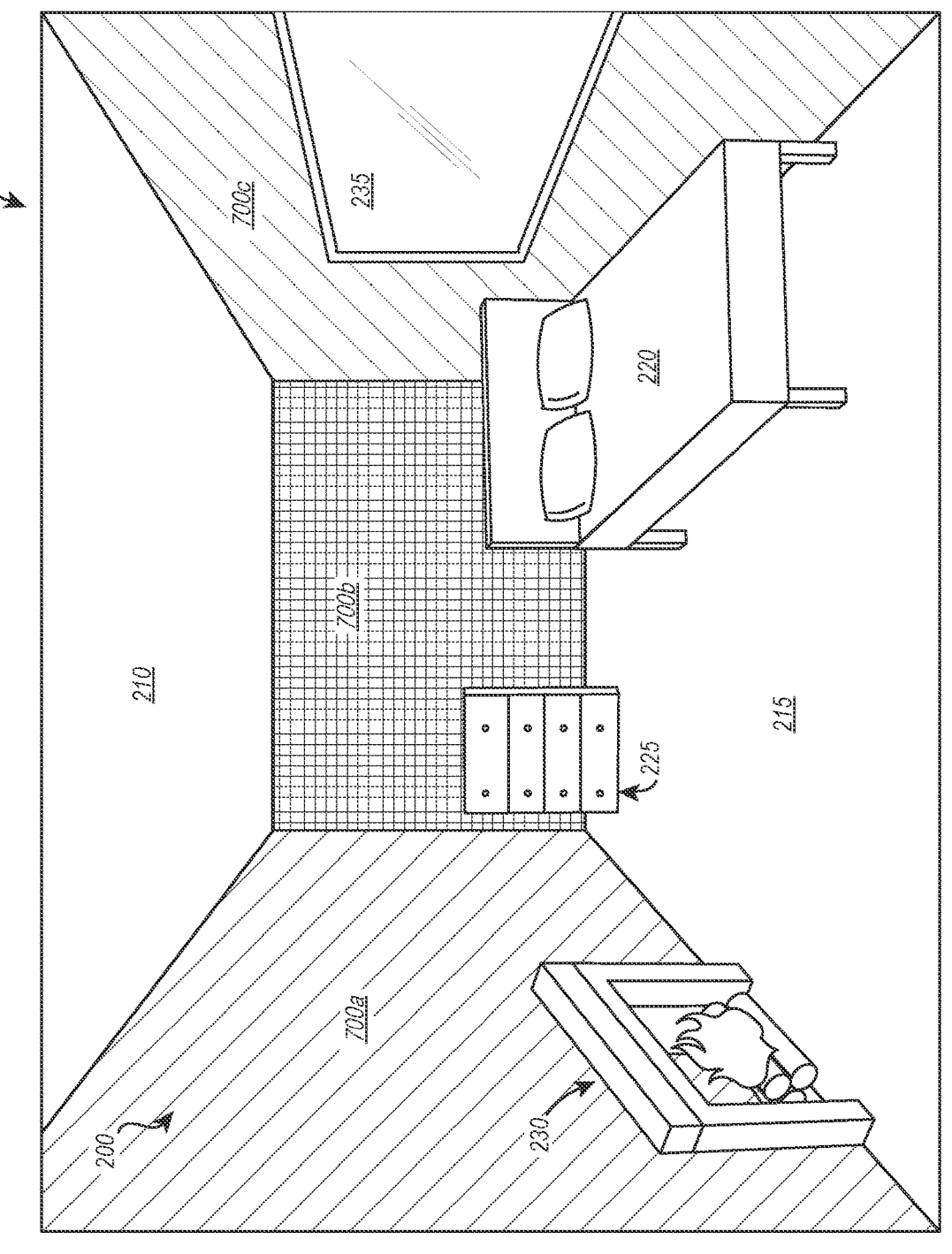
FIG. 7 depicts the exemplary colorized digital image of the bedroom shown in FIGS. 2, 4, and 5, wherein at least one proposed color and the parsed architectural objects have been integrated into the modified digital image of the bedroom.

By integrating a proposed color on at least one surface and integrating the parsed objects into the modified digital image 500, the image processing module 140 may also generate a colorized digital image 150, as shown in FIG. 7. As shown, coated walls 700a and 700c are shown with one proposed color, and wall 700b is shown with another proposed color. Further, the bed 220, the dresser 225, the fireplace 230, and the hung mirror 235 have been put back into the colorized digital image 150.

FIG. 8 illustrates a method 800 for dynamically parsing a digital image to identify coating surfaces. As shown in FIG. 8, the method 800 can include an act 810 of receiving a user-provided input comprising an indication of a particular environment. The method 800 can also include an act 820 of receiving a user-provided digital image of an environment. Both the input comprising an indication of the particular environment and the digital image of the environment can be received by the coating surface analysis software via the network connection.

FIG. 8 also illustrates that the method 800 can comprise an act 830 of identifying, with an image recognition module, one or more architectural objects within the user-provided digital image. The database subset of digital architectural templates may be stored in the digital architectural template database. As shown in FIG. 8, the method can include an act 840 of mapping digital architectural templates from the database subset to architectural objects within the digital image of the environment. The image recognition module may be configured to map digital architectural templates from the database subset to architectural objects within the digital image of the environment.

Method 800 may also comprise an act 850 of creating a modified digital image by parsing the identified architectural objects from the digital image of the environment. After the digital architectural templates are mapped to the architectural objects within the digital image of the environment, the image processing module may create a modified digital image by parsing the identified architectural objects from the digital image of the environment. As shown in FIG. 8, the method 800 may also comprise an act 860 of identifying surfaces within the modified digital image, which may also be accomplished by the image processing module.

Finally, method 800 can include an act 870 of identifying a proposed color for the surfaces within the modified digital image, and an act 880 of generating a colorized digital image by integrating the proposed color on at least one surface and integrating the parsed objects in the modified digital image. The image processing module may access a color database and identify a proposed color for a surface within the modified digital image. By integrating the proposed color on at least one surface and integrating the parsed objects in the modified digital image, the image processing module may also generate a colorized digital image. The image processing module may include a user interface component that allows the user to view various color options and select the proposed color from the color options.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The computer system may comprise or utilize a special-purpose or general-purpose computer system that includes computer hardware, such as, for example, one or more processors and system memory, as discussed in greater detail below. The computer system can also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, the computer system can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the computer system.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the computer system may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The computer system may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the computer system may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

A cloud-computing environment may comprise a system that includes one or more hosts that are each capable of running one or more virtual machines. During operation, virtual machines emulate an operational computing system, supporting an operating system and perhaps one or more other applications as well. Each host may include a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

In view of the foregoing, the present invention may be embodied in multiple different configurations, as outlined above, and as exemplified by the following aspects.

In a first aspect, a computer system for dynamically parsing a digital image to identify coating surfaces, can include one or more processors; and one or more computer-readable media having stored thereon executable instructions that when executed by the one or more processors configure the computer system to perform at least the following, as in particular performing the computerized method according to any of the following aspects twelve to twenty one: receive, through a network connection, a user-provided input comprising an indication of a particular environment; receive, through the network connection, a user-provided digital image, wherein the digital image comprises a picture of an environment and one or more objects; identify, with an image recognition module, the one or more objects within the user-provided digital image; and create a modified digital image by parsing the identified one or more objects from the user-provided digital image; wherein the object is preferably an architectural object.

In a second aspect of the computer system of aspect one, the executable instructions include instructions that are executable to configure the computer system to identify surfaces within the modified digital image, preferably surfaces of a room such as surfaces of walls, ceilings, and/or floors. In a third aspect of the computer system of aspects one or two, the executable instructions include instructions that are executable to configure the computer system to identify at least one proposed color for the surfaces within the modified digital image. In a fourth aspect of the computer system of aspect three, the executable instructions include instructions that are executable to configure the computer system to generate a colorized digital image by integrating the at least one proposed color on at least one surface and integrating the parsed one or more objects in the modified digital image, preferably at least two surfaces are shown in different proposed colors.

In a fifth aspect, in the computer system of any of aspects one through four, the step o identifying, with the image recognition module, one or more objects within the user-provided digital image can include: accessing, within a digital architectural template database, a database subset of one or more digital architectural templates for the particular environment; and mapping one or more digital architectural templates from the database subset to the one or more objects within the user-provided digital image.

In a sixth aspect, in the computer system of any of aspects one to five, the image recognition module comprises a machine learning algorithm. In a seventh aspect, in the computer system of any of aspects three through six, identifying at least one proposed color for the surfaces within the modified digital image can include identifying at least one color of at least one of the parsed one or more objects; and generating at least one proposed color based on the at least one identified color of at least one of the parsed one or more objects, preferably colors from multiple objects identified in the picture are analyzed. In eighth aspect, the computer system of any of aspects three to seven, identifying at least one proposed color for the surfaces within the modified digital image can include identifying at least one color of at least one of the parsed one or more objects; organizing the parsed one or more objects by a permanence attribute with respect to the particular environment; and generating at least one proposed color based on the identified colors and permanence attributes associated with the parsed one or more objects.

In a ninth aspect, in the computer system of any of aspects three to eight, the step of identifying at least one proposed color for the surfaces within the modified digital image can include obtaining geographic data about a user; accessing a color-geographic look-up table, wherein the color-geographic look-up table comprises color prevalence in association with various geographic regions; and generating at least one proposed color based on the geographic data about the user. In a tenth aspect, in the computer system of any of aspect three through nine, the step of identifying at least one proposed color for the surfaces within the modified digital image can include obtaining data about an age of a user; accessing a color-age look-up table, wherein the color-age look-up table comprises color prevalence in association with various ages; and generating at least one proposed color based on the data about the age of the user. In an eleventh aspect, in the computer system of any of aspects seven through ten, the step of generating at least one proposed color is based on the at least one identified color of at least one of the one or more parsed objects, permanence attributes associated with the one or more parsed objects, the geographic data about the user and/or the data about the age of the user.

In a twelfth aspect, another or additional configuration of the present invention can include a computerized method for use on a computer system comprising one or more processors and one or more computer-readable media having stored thereon executable instructions that when executed by the one or more processors configure the computer system to perform a method of dynamically parsing a digital image to identify coating surfaces, for instance on a computer system as defined in aspects one to eleven, wherein the method can include receiving, through a network connection, a user-provided input comprising an indication of a particular environment; receiving, through the network connection, a user-provided digital image, wherein the digital image comprises a picture of an environment and one or more objects; identifying, with an image recognition module, the one or more objects within the user-provided digital image; creating a modified digital image by parsing the identified one or more objects from the user-provided digital image; identifying surfaces, preferably surfaces of a room such as surfaces of walls, ceilings, and/or floors, within the modified digital image; identifying at least one proposed color for the surfaces within the modified digital image; and generating a colorized digital image by integrating the at least one proposed color on at least one surface and integrating the parsed one or more objects in the modified digital image, preferably at least two surfaces are shown in different proposed colors; wherein an object is preferably an architectural object.

In a thirteenth aspect, in the computerized method of aspect twelve, the step of identifying, with the image recognition module, one or more objects within the user-provided digital image can include accessing, within a digital architectural template database, a database subset of one or more digital architectural templates for the particular environment; and mapping one or more digital architectural templates from the database subset to the one or more objects within the user-provided digital image. In a fourteenth aspect, in the computerized method of aspects twelve or thirteen, the image recognition module comprises a machine learning algorithm. In a fifteenth aspect, in the computerized method of any of aspects twelve to fourteen, the step of identifying at least one proposed color for the surfaces within the modified digital image can include identifying at least one color of at least one of the parsed one or more objects; and generating at least one proposed color based on the at least one identified color of at least one of the one or more parsed objects, preferably colors from multiple objects identified in the picture are analyzed.

In a sixteenth aspect, in the computerized method of any of aspects twelve to fifteen, the step of identifying at least one proposed color for the surfaces within the modified image can include identifying at least one color of at least one of the parsed one or more objects; organizing the parsed one or more objects by a permanence attribute with respect to the particular environment; and generating at least one proposed color based on the identified colors and permanence attributes associated with the parsed one or more objects. In a seventeenth aspect, in the computerized method of any of aspects twelve to sixteen, the step of accessing, within a digital architectural template database, a database subset of one or more digital architectural templates for the particular environment can include obtaining geographic data about a user; accessing a geographic look-up table, wherein the geographic look-up table comprises one or more digital architectural templates in association with various geographic regions; and generating the database subset of one or more digital architectural templates based on the geographic data about the user.

In an eighteenth aspect, in the computerized method of any of aspects twelve to seventeen, the step of identifying at least one proposed color for the surfaces within the modified digital image can include obtaining geographic data about a user; accessing a color-geographic look-up table, wherein the color-geographic look-up table comprises color prevalence in association with various geographic regions; accessing a digital architectural template look-up table, wherein the digital architectural template look-up table comprises color prevalence in association with the database subset of one or more digital architectural templates based on the geographic data about the user; identifying correlations between the color-geographic look-up table and the digital architectural template look-up table; and generating at least one proposed color based on the identified correlations between the color-geographic look-up table and the digital architectural template look-up table. In a nineteenth aspect, in the computerized method of any of aspects thirteen to eighteen, the step of accessing, within a digital architectural template database, a database subset of one or more digital architectural templates for the particular environment can include obtaining data about an age of a user; accessing an age look-up table, wherein the age look-up table comprises one or more digital architectural templates in association with various ages; generating the database subset of one or more digital architectural templates based on the data about the age of the user.

In a twentieth aspect, in the computerized method of any of aspects twelve to nineteen, the step of identifying at least one proposed color for the surfaces within the modified digital image can include obtaining data about an age of a user; accessing a color-age look-up table, wherein the color-age look-up table comprises color prevalence in association with various ages; accessing a digital architectural template look-up table, wherein the digital architectural template look-up table comprises color prevalence in association with the database subset of one or more digital architectural templates based on the data about the age of the user; identifying correlations between the color-age look-up table and the digital architectural template look-up table; and generating at least one proposed color based on the identified correlations between the color-age look-up table and the digital architectural template look-up table. In a twenty-first aspect, in the computerized method of any of aspects twelve to twenty, the step of generating at least one proposed color is based on the at least one identified color of at least one of the parsed one or more objects, permanence attributes associated with the parsed one or more objects, the geographic data about the user and/or the data about the age of the user.

In a twenty-second aspect, another or additional configuration of the present invention can include a computer program product having one or more computer storage media having stored thereon computer-executable instructions that, when executed at a processor, cause a computer system to perform a method for dynamically parsing a digital image to identify coating surfaces, as in particular performing the computerized method according to any of aspects twelve to twenty-one, for instance on a computer system as defined in aspects one to eleven, the method can include receiving, through a network connection, a user-provided input comprising an indication of a particular environment; receiving, through the network connection, a user-provided digital image, wherein the digital image comprises a picture of an environment and one or more objects; identifying, with an image recognition module, the one or more objects within the user-provided digital image; creating a modified digital image by parsing the identified one or more objects from the user-provided digital image; identifying surfaces preferably surfaces of a room such as surfaces of walls, ceilings, and/or floors, within the modified digital image; identifying at least one proposed color for the surfaces within the modified digital image; and generating a colorized digital image by integrating the at least one proposed color on at least one surface and integrating the parsed one or more objects in the modified digital image, preferably at least two surfaces are shown in different proposed colors; wherein the object is preferably an architectural object.

The present computer system may be embodied in other specific forms without departing from its spirit or essential characteristics. The foregoing description is to be considered in all respects only as illustrative and not restrictive, and therefore the described scope is indicated by the appended claims rather than by the description. All changes which come within the meaning and range of equivalency of the claims are to be embraced within their scope.

We claim:

1. A computer system for dynamically parsing a digital image to identify coating surfaces, comprising:
   one or more processors; and
   one or more computer-readable media having stored thereon executable instructions that when executed by the one or more processors configure the computer system to perform at least the following:
   receive, through a network connection, a user-provided input comprising an indication of a particular environment;
   receive, through the network connection, a user-provided digital image, wherein the digital image comprises a picture of an environment and one or more objects;
   identify, with an image recognition module, the one or more objects within the user-provided digital image;
   create a modified digital image by parsing the identified one or more objects from the user-provided digital image;
   identify surfaces within the modified digital image;
   identifying at least one proposed color for the surfaces within the modified digital image, wherein identifying at least one proposed color for the surfaces within the modified digital image comprises:
      obtaining data about an age of a user,
      accessing a color-age look-up table, wherein the color-age look-up table comprises color prevalence in association with various ages,
      accessing a digital architectural template look-up table, wherein the digital architectural template look-up table comprises color prevalence in association with a database subset of one or more digital architectural templates based on the data about the age of the user,
      identifying correlations between the color-age look-up table and the digital architectural template look-up table, and
      generating at least one proposed color based on the identified correlations between the color-age look-up table and the digital architectural template look-up table; and
   generate a colorized digital image by integrating the at least one proposed color on at least one surface and integrating the parsed one or more objects in the modified digital image.

2. The computer system of claim 1, wherein identifying, with the image recognition module, one or more objects within the user-provided digital image comprises:
   accessing, within a digital architectural template database, a database subset of one or more digital architectural templates for the particular environment; and mapping one or more digital architectural templates from the database subset to the one or more objects within the user-provided digital image.

3. The computer system of claim 2, wherein the image recognition module comprises a machine learning algorithm.

4. The computer system of claim 1, wherein identifying at least one proposed color for the surfaces within the modified digital image comprises:

identifying at least one color of at least one of the parsed one or more objects; and generating at least one proposed color based on the at least one identified color of at least one of the parsed one or more objects.

5. The computer system of claim 1, wherein identifying at least one proposed color for the surfaces within the modified digital image comprises:

identifying at least one color of at least one of the parsed one or more objects;

organizing the parsed one or more objects by a permanence attribute with respect to the particular environment; and generating at least one proposed color based on the at least one identified colors and permanence attributes associated with the parsed one or more objects.

6. The computer system of claim 1, wherein identifying at least one proposed color for the surfaces within the modified digital image comprises:

obtaining geographic data about a user;

accessing a color-geographic look-up table, wherein the color-geographic look-up table comprises color prevalence in association with various geographic regions; and generating at least one proposed color based on the geographic data about the user.

7. A computerized method for use on a computer system comprising one or more processors and one or more computer-readable media having stored thereon executable instructions that when executed by the one or more processors configure the computer system to perform a method of dynamically parsing a digital image to identify coating surfaces, the method comprising:

receiving, through a network connection, a user-provided input comprising an indication of a particular environment;

receiving, through the network connection, a user-provided digital image, wherein the digital image comprises a picture of an environment and one or more objects;

identifying, with an image recognition module, the one or more objects within the user-provided digital image;

creating a modified digital image by parsing the identified one or more objects from the user-provided digital image;

identifying surfaces within the modified digital image;

identifying at least one proposed color for the surfaces within the modified digital image, wherein identifying at least one proposed color for the surfaces within the modified digital image comprises:

obtaining geographic data about a user, accessing a color-geographic look-up table, wherein the color-geographic look-up table comprises color prevalence in association with various geographic regions, accessing a digital architectural template look-up table, wherein the digital architectural template look-up table comprises color prevalence in association with a database subset of one or more digital architectural templates based on the geographic data about the user, identifying correlations between the color-geographic look-up table and the digital architectural template look-up table, and generating at least one proposed color based on the identified correlations between the color-geographic look-up table and the digital architectural template look-up table; and generating a colorized digital image by integrating the at least one proposed color on at least one surface and integrating the parsed one or more objects in the modified digital image.

8. The computerized method of claim 7, wherein identifying, with the image recognition module, one or more objects within the user-provided digital image comprises:

accessing, within a digital architectural template database, a database subset of one or more digital architectural templates for the particular environment; and mapping one or more digital architectural templates from the database subset to the one or more objects within the user-provided digital image.

9. The computerized method of claim 8, wherein the image recognition module comprises a machine learning algorithm.

10. The computerized method of claim 7, wherein identifying at least one proposed color for the surfaces within the modified digital image comprises:

identifying at least one color of at least one of the parsed one or more objects; and generating at least one proposed color based on the at least one identified color of at least one of the parsed one or more objects.

11. The computerized method of claim 7, wherein identifying at least one proposed color for the surfaces within the modified image comprises:

identifying at least one color of at least one of the parsed one or more objects;

organizing the parsed one or more objects by a permanence attribute with respect to the particular environment; and generating at least one proposed color based on the identified colors and permanence attributes associated with the parsed one or more objects.

12. The computerized method of claim 8, wherein accessing, within a digital architectural template database, a database subset of one or more digital architectural templates for the particular environment comprises:

obtaining data about an age of a user;

accessing an age look-up table, wherein the age look-up table comprises one or more digital architectural templates in association with various ages; and generating the database subset of one or more digital architectural templates based on the data about the age of the user.

13. The computerized method of claim 7, wherein identifying at least one proposed color for the surfaces within the modified digital image comprises:

obtaining data about an age of a user;

accessing a color-age look-up table, wherein the color-age look-up table comprises color prevalence in association with various ages;

accessing a digital architectural template look-up table, wherein the digital architectural template look-up table comprises color prevalence in association with a database subset of one or more digital architectural tem-
plates based on the data about the age of the user;

identifying correlations between the color-age look-up
table and the digital architectural template look-up
table; and generating at least one proposed color based on the
identified correlations between the color-age look-up
table and the digital architectural template look-up
table.

14. A computer program product comprising one or more
non-transitory computer storage media having stored
thereon computer-executable instructions that, when
executed at a processor, cause a computer system to perform
a method for dynamically parsing a digital image to identify
coating surfaces, the method comprising:

receiving, through a network connection, a user-provided
input comprising an indication of a particular environ-
ment;

receiving, through the network connection, a user-pro-
vided digital image, wherein the digital image com-
prises a picture of an environment and one or more
objects;

identifying, with an image recognition module, the one or
more objects within the user-provided digital image;

creating a modified digital image by parsing the identified
one or more objects from the user-provided digital
image;

identifying surfaces within the modified digital image;

identifying at least one proposed color for the surfaces
within the modified digital image, wherein identifying
at least one proposed color for the surfaces within the
modified digital image comprises:

obtaining geographic data about a user, accessing a color-geographic look-up table, wherein
the color-geographic look-up table comprises color
prevalence in association with various geographic
regions, accessing a digital architectural template look-up table,
wherein the digital architectural template look-up
table comprises color prevalence in association with
a database subset of one or more digital architectural
templates based on the geographic data about the
user, identifying correlations between the color-geographic
look-up table and the digital architectural template
look-up table, and generating at least one proposed color based on the
identified correlations between the color-geographic
look-up table and the digital architectural template
look-up table; and generating a colorized digital image by integrating the at
least one proposed color on at least one surface and
integrating the parsed one or more objects in the
modified digital image.

\*  \*  \*  \*  \*